United States Patent
Yokota

[11] 4,265,529
[45] May 5, 1981

[54] CAMERA VIEWFINDER
[75] Inventor: Hideo Yokota, Tokyo, Japan
[73] Assignee: Canon Kabushiki Kaisha, Tokyo, Japan
[21] Appl. No.: 16,724
[22] Filed: Mar. 2, 1979
[30] Foreign Application Priority Data
  Mar. 9, 1978 [JP] Japan .................................. 53-27054
[51] Int. Cl.³ ........................ G03B 13/08; G02B 3/04
[52] U.S. Cl. .................................. 354/224; 350/410; 350/438; 350/443
[58] Field of Search ...................... 354/224, 225, 219; 350/17 SE, 175 NG, 189

[56] References Cited
U.S. PATENT DOCUMENTS

| | | | |
|---|---|---|---|
| 2,453,218 | 11/1948 | Grey | 350/175 NG |
| 3,967,290 | 6/1976 | Waaske | 354/224 X |
| 3,992,085 | 11/1976 | Momiyama | 350/189 |
| 4,062,625 | 12/1977 | Fleischman et al. | 350/175 NG X |
| 4,105,308 | 8/1978 | Owen, Jr. et al. | 350/175 NG X |

Primary Examiner—L. T. Hix
Assistant Examiner—Thomas H. Tarcza
Attorney, Agent, or Firm—Toren, McGeady and Stanger

[57] ABSTRACT

In a single lens reflex camera a viewfinder contains an eye-piece facing the exit surface of a roof type pentagonal prism. The eye-piece includes, from the pentagonal prism end, a positive lens and a negative meniscus lens slightly spaced from the positive lens. A concave surface on the positive lens faces the pentagonal prism. The positive lens is composed of a plastic synthetic resin, letting $R_1$, $R_2$, $R_3$ and $R_4$ denote the radii of curvature of the lens surface of the eye-piece in that order from the pentagonal prism and f denote the composite focal length of the eye-piece, the following inequalities are satisfied:

$$-1 < \left(\frac{1}{R_1} + \frac{1}{R_4}\right)f < 1.5$$

$$0.18 < \frac{\left|\frac{1}{R_3} - \frac{1}{R_4}\right|}{\left|\frac{1}{R_1} - \frac{1}{R_2}\right|} < 0.3$$

9 Claims, 39 Drawing Figures

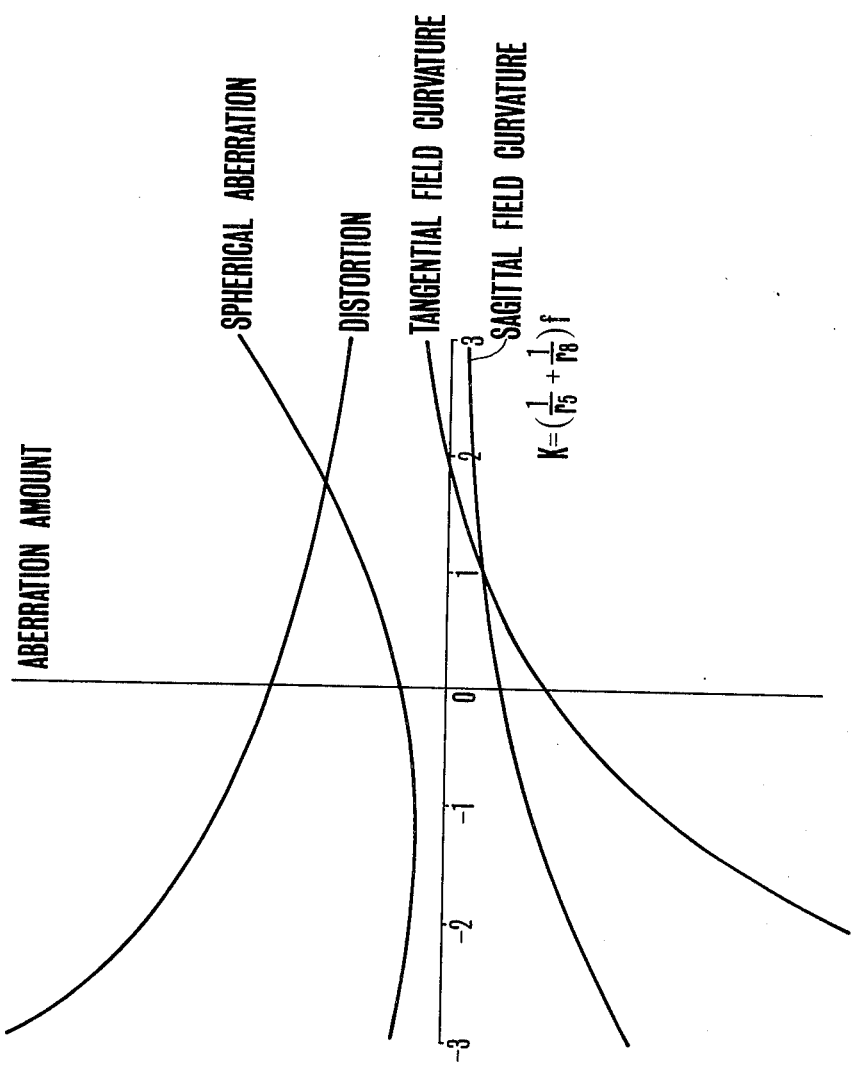

FIG.3A  FIG.3B  FIG.3C
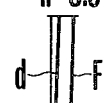
HEIGHT ON ENTRANCE PUPIL
h=3.5
OBJECT HEIGHT
Y=20.2
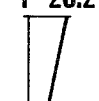
OBJECT HEIGHT
Y=20.2
-0.2  0  0.2 (d)    -2  0  2 (d)    -5  0  5 (%)
SPHERICAL ABERRATION    ASTIGMATISM    DISTORTION
FIG.3D
0.25°
-0.25°
OBJECT HEIGHT
Y=15
LATERAL ABERRATION
FIG.4A  FIG.4B  FIG.4C
HEIGHT ON ENTRANCE PUPIL
h=3.5
OBJECT HEIGHT
Y=20.2
OBJECT HEIGHT
Y=20.2
-0.2  0  0.2 (d)    -2  0  2 (d)    -5  0  5 (%)
SPHERICAL ABERRATION    ASTIGMATISM    DISTORTION
FIG.4D
0.25°
-0.25°
OBJECT HEIGHT
Y=15
LATERAL ABERRATION

FIG.5A
HEIGHT ON ENTRANCE PUPIL
h=3.5
-0.2  0  0.2 (d)
SPHERICAL ABERRATION
FIG.5B
OBJECT HEIGHT
Y=20.2
-2  0  2 (d)
ASTIGMATISM
FIG.5C
OBJECT HEIGHT
Y=20.2
-5  0  5 (%)
DISTORTION
FIG.5D
0.25°
-0.25°
OBJECT HEIGHT
Y=15
LATERAL ABERRATION
FIG.6A
HEIGHT ON ENTRANCE PUPIL
h=3.5
-0.2  0  0.2 (d)
SPHERICAL ABERRATION
FIG.6B
OBJECT HEIGHT
Y=20.2
-2  0  2 (d)
ASTIGMATISM
FIG.6C
OBJECT HEIGHT
Y=20.2
-5  0  5 (%)
DISTORTION
FIG.6D
0.25°
-0.25°
OBJECT HEIGHT
Y=15
LATERAL ABERRATION

FIG.7A
HEIGHT ON ENTRANCE PUPIL
h=3.5
-0.2  0  0.2 (d)
SPHERICAL ABERRATION
FIG.7B
OBJECT HEIGHT
Y=20.2
-2  0  2 (d)
ASTIGMATISM
FIG.7C
OBJECT HEIGHT
Y=20.2
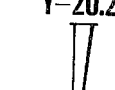
-5  0  5 (%)
DISTORTION
FIG.7D
0.25°
-0.25°
———— OBJECT HEIGHT Y=15
LATERAL ABERRATION
FIG.8A
HEIGHT ON ENTRANCE PUPIL
h=3.5
-0.2  0  0.2 (d)
SPHERICAL ABERRATION
FIG.8B
OBJECT HEIGHT
Y=20.2
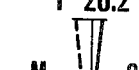
-2  0  2 (d)
ASTIGMATISM
FIG.8C
OBJECT HEIGHT
Y=20.2
-5  0  5 (%)
DISTORTION
FIG.8D
0.25°
-0.25°
———— OBJECT HEIGHT Y=15
LATERAL ABERRATION

FIG.9A
HEIGHT ON ENTRANCE PUPIL
h=3.5
-0.2  0  0.2 (d)
SPHERICAL ABERRATION
FIG.9B
OBJECT HEIGHT
Y=20.2
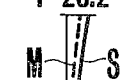
-2  0  2 (d)
ASTIGMATISM
FIG.9C
OBJECT HEIGHT
Y=20.2
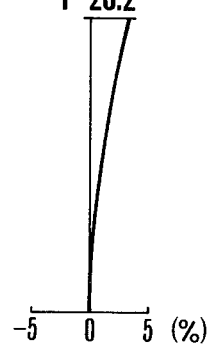
-5  0  5 (%)
DISTORTION
FIG.9D
OBJECT HEIGHT
Y=15
LATERAL ABERRATION
FIG.10A
HEIGHT ON ENTRANCE PUPIL
h=3.5
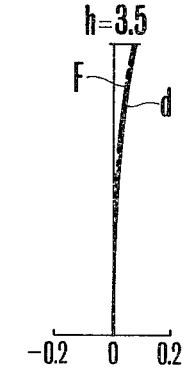
-0.2  0  0.2 (d)
SPHERICAL ABERRATION
FIG.10B
OBJECT HEIGHT
Y=20.2
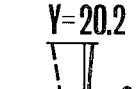
-2  0  2 (d)
ASTIGMATISM
FIG.10C
OBJECT HEIGHT
Y=20.2
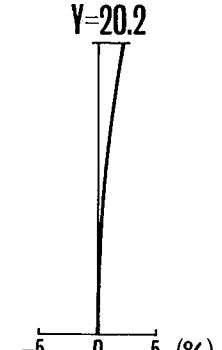
-5  0  5 (%)
DISTORTION
FIG.10D
OBJECT HEIGHT
Y=15
LATERAL ABERRATION HEIGHT ON ENTRANCE PUPIL
h=3.5

−0.2  0  0.2 (d)
SPHERICAL ABERRATION

OBJECT HEIGHT
Y=20.2

−2  0  2 (d)
ASTIGMATISM

OBJECT HEIGHT
Y=20.2

−5  0  5 (%)
DISTORTION 0.25°
−0.25°
OBJECT HEIGHT
Y=15
LATERAL ABERRATION

CAMERA VIEWFINDER

BACKGROUND OF THE INVENTION

This invention relates to view finders for single lens reflex cameras, and more particularly to a view finder using an eye-piece with a plastic lens.

Recently, a strong demand has developed for single lens reflex cameras with viewfinders having a viewfield image of good quality and high finder magnification. On the other hand, the amateur camera is, because of its low price, required to be produced at low cost.

An increase in finder magnification can be achieved by decreasing the size of the roof type pentagonal prism (referred to) to shorten the distance between the focusing plane and the primary principal point of the eye-piece. But, the employment of this arrangement imparts a wider angle to the eye-piece which makes it more difficult to correct astigmatism and distortion.

Decreasing the production cost is most effectively fulfilled by manufacturing the lenses from molded plastic. However, plastics such as acrylic resin have a refractive index which is low as compared to glass materials usually used in the eye-piece. This makes it difficult to correct spherical aberration and distortion. Plastic lenses are also very susceptible to scratches.

SUMMARY OF THE INVENTION

An object of the present invention is to improve the image quality of a viewfinder.

A second object is to make use of synthetic resin in a component lens of an eye-piece of the viewfinder, while nevertheless correcting spherical aberration, distortion, astigmatism and axial chromatic aberration.

A third object is to make it possible to easily adopt an aspherical surface.

A fourth object is to make it difficult for the outwardly facing surface of an eye-piece to be susceptible to scratches.

To achieve these objects, an eye-piece of the finder is constructed from a positive lens and a negative meniscus lens of forward concavity arranged in that order from the front and spaced from each other by a small distance, the material of the positive lens is made of a plastic synthetic resin, and the following conditions are satisfied:

$$53 \leq \nu I \leq 55$$
$$25 \leq \nu II \leq 29$$
$$-1 < \left(\frac{1}{R_1} + \frac{1}{R_4}\right) f < 1.5$$
$$0.18 < \frac{\left|\frac{1}{R_3} - \frac{1}{R_4}\right|}{\left|\frac{1}{R_1} - \frac{1}{R_2}\right|} < 0.3$$

wherein $\nu I$ is the Abbe number of the positive lens; $\nu II$ is the Abbe number of the negative meniscus lens; $R_1$, $R_2$, $R_3$ and $R_4$ are the radii of curvature of the successive lens surfaces of the eye-piece counting from the pentaprism side; and f is the composite focal length of the eye-piece.

BRIEF DESCRIPTION OF THE DRAWINGS

FIG. 2 is a graph showing various aberration curves related to configurations of the eye-piece.

FIGS. 3A-3D are aberration curves of Example 1.
FIGS. 4A-4D are aberration curves of Example 2.
FIGS. 5A-5D are aberration curves of Example 3.
FIGS. 6A-6D are aberration curves of Example 4.
FIGS. 7A-7D are aberration curves of Example 5.
FIGS. 8A-8D are aberration curves of Example 6.
FIGS. 9A-9D are aberration curves of Example 7.
FIGS. 10A-10D are aberration curves of Example 8.

DESCRIPTION OF THE PREFERRED EMBODIMENTS

Correction of chromatic aberration of an eye-piece is achieved by combining two lenses, having positive and negative powers, and made of materials whose dispersions are different from each other. In doing so, when a plastic is selected for use in the positive lens, and a glass in the negative lens, it is necessary to consider that the Abbe numbers of those of the plastics which are usuable as optical materials of this kind such as acrylic resin are from 53 to 55. Hence, it is necessary that the negative lens be made of a material having the highest dispersion among the glass materials for combination with the positive lens made of the plastic to remove chromatic aberration. Abbe numbers from 25 to 29 are suitable for the glass material. The embodiments which will be described later use a dense flint glass whose Abbe number is 27.5.

Figure 1:
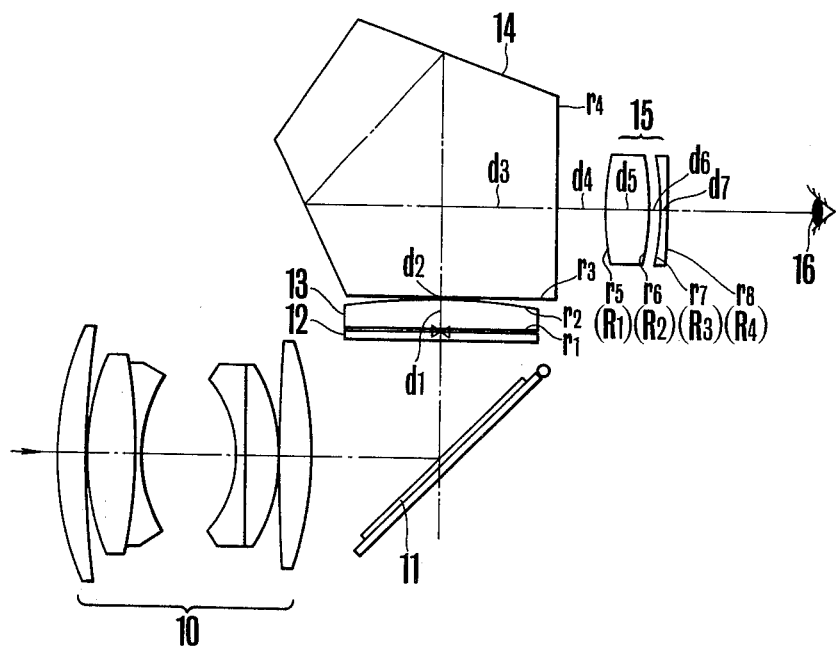
FIG. 1 is a sectional view showing an embodiment of the present invention.
Figure 11A:
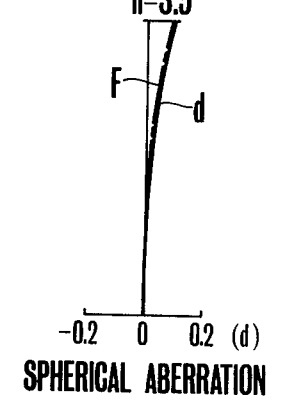
FIGS. 11A-11D are aberration curves of Example 9.
Figure 11B:
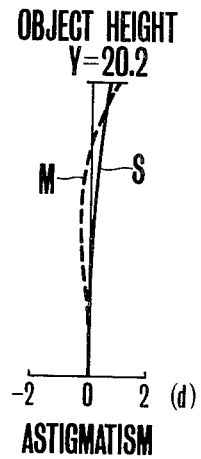
Figure 11C:
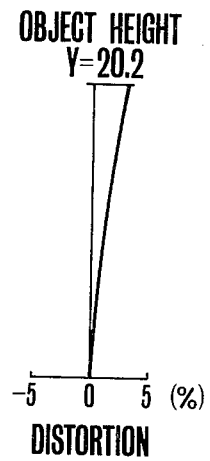
Figure 11D:
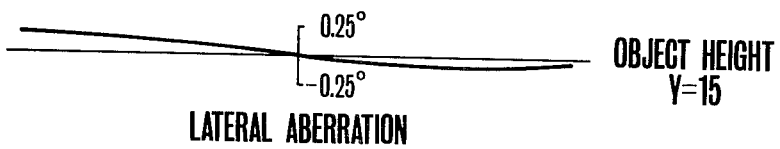

Furthermore, good correction of various aberrations is affected greatly by the configuration of the lens surfaces. FIG. 1 shows a finder optical system according to the present invention. The system includes a photographic lens 10 a quick return tiltable-mirror 11, a focusing screen 12 provided with bi-prisms at the center, a condenser lens 13, a pentaprism 14, an eye-piece 15, and an eye point 16. It should be noted that the photographic lens is depicted in a somewhat reduced scale.

Now, employing $K_1 = ((1/R_1) + (1/R_4)) \cdot f$ as a constant expressing the configuration of $R_1$ and $R_4$ (corresponding to $r_5$ and $r_8$ in FIG. 1), and selecting $R_2$ and $R_3$ (corresponding to $r_6$ and $r_7$ in FIG. 1) to be almost equal constant values almost equal to each other, we have variations in the amount of aberrations, namely, spherical aberration, distortion, astigmatism (sagittal field curvature and tangential field curvature) with respect to $K_1$ in a range of $-3 < K_1 < 3$ suited for lens manufacture as shown in FIG. 2.

As will be understood from this figure, on the spherical aberration, we find $-3 < K_1 < 1.5$ to be an allowable aberration range. And, as to the astigmatism, $-1 < K_1 < 3$ may be selected to establish the allowance. In other words, when $K_1$ becomes lens than $-1$, the astigmatism rapidly increases in the negative sense, and the distortion in the positive sense also is not acceptable. Conversely when $K_1$ is above 1.5, positive spherical aberration becomes considerable and disadvantageous. Therefore, a range of $K_1$ values is confined as $-1 < K_1 < 1.5$.

Next, in a single lens reflex camera, focusing or the distance measurement is usually performed by a biprism or micro-prism in the central region of the view field. The accuracy of distance measurement is greatly affected by axial chromatic aberrations.

For the $R_1$ and $R_4$ conditions as mentioned above, and also for the Abbe number of the positive lens taken at its central value of 54 and the Abbe number of the negative lens at about 27 suitable for correction of chromatic aberration, a condition necessary to correct the corresponding axial chromatic aberration is expressed as $$K_2 = \frac{\left|\frac{1}{R_3} - \frac{1}{R_4}\right|}{\left|\frac{1}{R_1} - \frac{1}{R_2}\right|}$$

and a good correction can be achieved at about $K_2=0.26$.

When the value of $K_2$ exceeds 0.26, the axial chromatic aberration tends to be under-corrected. When $k_2$ is equal to or less than 0.26, an over-correcting tendency results. Moreover, to increase the value of $K_2$ is to strengthen the negative power. Hence an increase in negative astigmatism is called for, but the distortion is in a decreasing direction.

After the synthetic examination of the above items, we have set forth $0.18 < K_2 < 0.3$. When the upper limit of this inequality is violated, the negative astigmatism becomes excessive, and when below the lower limit, the axial chromatic aberration is under-corrected.

In the following, the prerequisites $K_1$ and $K_2$ are be explained in connection with specific examples which will be described later with respect to numerical data.

Example 1 uses $K_1 = -0.752$ and $K_2 = 0.202$. The various aberrations are corrected to an almost good state as shown in the aberration curves of FIGS. 3A-3D. However, the axial chromatic aberration can be said to be somewhat under-corrected.

Example 4 uses $K_1 = 0.178$ and $K_2 = 0.264$. The various aberrations are corrected to an almost good state as shown in FIGS. 6A-6D.

In comparison with Example 1, the value of $K_1$ of Example 4 is in a direction toward small negative astigmatism, but, because of the large $K_2$, a large negative astigmatism results. For this reason, however, the distortion is small.

Example 7 uses $K_1 = 1.169$ and $K_2 = 0.282$. As shown in FIGS. 9A-9D, the various aberrations are corrected to an almost good state, but, because of the large $K_1$, the spherical aberration is appreciable to some extent.

It is evident from the above three examples that in the spherical system, the ranges of $K_1$ and $K_2$ defined in the conditional formulae are proper.

Next, a further advance in aberrational correction is effectively achieved by introducing an aspherical surface into the positive lens. This will be proven by practical examples.

In a lens which does not greatly refract both on-axis and off-axis rays passing therethrough and which has an axial thickness of not more than 10% of the focal length of the eye-piece lens system, such as the positive lens in the eye-piece lens constructed in accordance with the present invention, whichever of the first and second surfaces of that lens we may select for introduction of an aspherical surface thereto will lead an almost equivalent result. Accordingly, those of the examples which are described below are limited to consideration of the surface $r_5$ alone for introduction of the aspherical surface.

Figure 12:
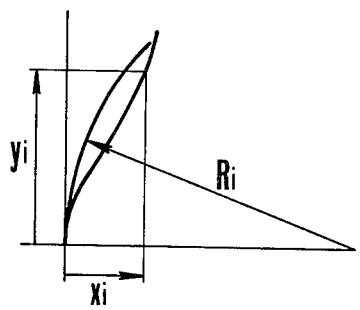
FIG. 12 is a diagram depicting a fundamental form of an aspherical lens surface.

As to determine the aspherical surface, the shown in FIG. 12, X axis has a positive direction along the light-propagation direction on the optical axis, and a Y-axis is taken in perpendicular to the X axis. Hence co-ordinates $(x_i, y_i)$ of one point on a rotation symmetric aspherical surface i are expressed by the following equation:

$$x_i = R_i[1 - (1 - \frac{y_i^2}{R_i^2})^{\frac{1}{2}}] + B_i y_i^4 + C_i y_i^6$$

where $R_i$ is the radius of curvature of the vertex of the aspherical surface; and $B_i$ and $C_i$ are the aspherical coefficients.

Example 2 represents an improvement of the eye-piece lens of Example 1 with respect to the distortion by changing the $r_5$ surface to an aspherical surface in accordance with the above-defined equation whose aspherical coefficient B is given a value, say, $B_5 = -5 \times 10^{-6}$. The resultant aberrations are shown in FIGS. 3A-3D. This leads, however, to sacrifice the negative astigmatism to some extent.

Example 3 introduces into the $r_5$ surface of the eye-piece lens of Example 1 an aspherical surface defined by $B_5 = -5 \times 10^{-6}$ and $C_5 = 5 \times 10^{-8}$. As shown in FIGS. 5A-5D, the astigmatism is improved as compared with Example 2.

Example 5 introduces into the $r_5$ surface of the eye-piece lens of Example 4 an aspherical surface wherein $B_5 = -5 \times 10^{-6}$. As shown in FIGS. 7A-7D, the distortion is improved. This, however, leads to increase the negative astigmatism.

Example 6 introduces into the $r_5$ surface of the eye-piece lens of Example 4 an aspherical surface wherein $B_5 = -5 \times 10^{-6}$ and $C_5 = 5 \times 10^{-8}$. As shown in FIGS. 8A-8D, the spherical aberration, astigmatism and distortion are all improved.

Example 8 introduces into the $r_5$ surface of the eye-piece lens of Example 7 an aspherical surface wherein $B_5 = -5 \times 10^{-6}$. As shown in FIGS. 10A-10D, the spherical aberration and distortion are improved. In this case also, the negative astigmatism is increased.

Example 9 introduces into the $r_5$ surface of the eye-piece lens of Example 7 an aspherical surface wherein $B_5 = -5 \times 10^{-6}$ and $C_5 = 5 \times 10^{-8}$. As shown in FIGS. 11A-11D, the spherical aberration, astigmatism and distortion are all improved.

In the following, the examples are described.

EXAMPLE 1

| | r | d | Nd | ν |
|---|---|---|---|---|
| 1 | ∞ | 3.4 | 1.5230 | 58.6 |
| 2 | −78.32 | 0.2 | | |
| 3 | ∞ | 75.22 | 1.51633 | 64.1 |
| 4 | ∞ | 5.30 | | |
| 5 | 60.00 | 4.40 | 1.49300 | 54.2 |
| 6 | −34.287 | 1.00 | | |
| 7 | −26.529 | 1.20 | 1.75520 | 27.5 |
| 8 | −35.184 | | | | where $r_1$ and $r_2$ are the condenser lens, and $r_3$ and $r_4$ are the pentaprism. And, the distance from the focal plane of the focusing screen to $r_1$ is 0.3. $K_1 = 0.752$; $K_2 = 0.202$. Visible Power $= -1.1$ diopter; Focal length of the eye-piece lens $f = 63.93$.

EXAMPLE 2

The numerical data of Example 1 apply except for the r₅ surface which is changed to an aspherical surface with the aspherical coefficient $B_5 = -5 \times 10^{-6}$.

EXAMPLE 3

The numerical data of Example 1 apply except for the r₅ surface which is changed to an aspherical surface with the aspherical coefficients $B_5 = -5 \times 10^{-3}$; $C_5 = 5 \times 10^{-6}$.

EXAMPLE 4

| | r | d | Nd | ν |
|---|---|---|---|---|
| 1 | ∞ | 3.4 | 1.52300 | 58.60 |
| 2 | −78.32 | 0.2 | | |
| 3 | ∞ | 75.22 | 1.51633 | 64.10 |
| 4 | ∞ | 5.30 | | |
| 5 | 41.026 | 4.40 | 1.49300 | 54.20 |
| 6 | −33.635 | 1.00 | | |
| 7 | −27.925 | 1.20 | 1.75520 | 27.50 |
| 8 | −46.475 | | | |

Distance from the focal plane of the focusing screen to the r₁ surface is 0.3; $K_1 = 0.178$; $K_2 = 0.264$; Visibility $= -1.0$ diopter; Focal length of the eye-piece lens $f = 62.43$.

EXAMPLE 5

The numerical data of Example 4 apply except for the r₅ surface which is changed to an aspherical surface with the aspherical coefficient $B_5 = -5 \times 10^{-6}$.

EXAMPLE 6

The numerical data of Example 4 apply except for the r₅ surface which is changed to an aspherical surface with the aspherical coefficients $B_5 = -5 \times 10^{-6}$; $C_5 = 5 \times 10^{-8}$.

EXAMPLE 7

| | r | d | Nd | ν |
|---|---|---|---|---|
| 1 | ∞ | 3.4 | 1.5230 | 58.6 |
| 2 | −78.32 | 0.2 | | |
| 3 | ∞ | 75.22 | 1.51633 | 64.1 |
| 4 | ∞ | 5.3 | | |
| 5 | 33.003 | 4.4 | 1.49300 | 54.2 |
| 6 | −36.657 | 1.0 | | |
| 7 | −36.464 | 1.2 | 1.75520 | 27.5 |
| 8 | −89.442 | | | |

Distance from the focal plane of the focusing screen to the r₁ surface is 0.3; $K_1 = 1.169$; $K_2 = 0.282$; Visibility $= -1.0$ diopter; Focal length of the eye-piece lens $f = 61.13$.

EXAMPLE 8

The numerical data of Example 7 apply except for the r₅ surface which is changed to an aspherical surface with the aspherical coefficient $B_5 = -5 \times 10^{-6}$.

EXAMPLE 9

The numerical data of Example 7 apply except for the r₅ surface which is changed to an aspherical surface with the aspherical coefficients $B_5 = -5 \times 10^{-6}$; $C_5 = 5.86 \times 10^{-8}$.

The states of spherical aberration, astigmatism, distortion and coma of the above described Examples 1 to 9 are respectively shown in FIGS. 3A to 11D. Further, the positive lens and the negative lens are separated from each other so that it is possible to form either surface of the positive lens to an aspherical surface, and to avoid the disadvantage due to the difference between the coefficients of thermal expansion of the glass and plastic.

What is claimed is:

1. A camera viewfinder comprising:
a roof type pentagonal prism for reflecting light from a scene; and an eyepiece having a positive lens arranged to face the exiting face of said pentagonal prims and, after an air space, a negative lens, said positive lens being biconvex and being made of a synthetic resin, and said negative lens being meniscus and concave toward the pentagonal prism, being made of an optical glass, said lenses fulfilling the following inequalities:

$$-1 < \left(\frac{1}{R_1} + \frac{1}{R_4}\right) \cdot f < 1.5$$

$$0.18 < \frac{\left|\frac{1}{R_3} - \frac{1}{R_4}\right|}{\left|\frac{1}{R_1} - \frac{1}{R_2}\right|} < 0.3$$

wherein $R_1$, $R_2$, $R_3$ and $R_4$ are the radii of curvature of the individual lens surfaces of the eyepiece; and f is the focal length of the eyepiece; at least one of the surfaces of said positive lens being an aspherical surface.

2. A camera viewfinder as described in claim 1, wherein at least one of the surfaces of said positive lens is an aspherical surface.

3. A camera viewfinder as described in claim 1, wherein letting $\nu I$ denote the Abbe number of the medium material of said positive lens, and $\nu II$ denote the Abbe number of the medium material of said negative lens, the following conditions are satisfied:

$53 \leq \nu I \leq 55$ $25 \leq \nu II \leq 29$.

4. A camera viewfinder comprising:
a roof type pentagonal prism for reflecting light from a scene; said prism having an entrance face and an exit face, a condenser lens arranged to face the entrance face of said pentagonal prism, and an eyepiece having a positive lens arranged to face the exit face of said pentagonal prism and, after an air space, a negative lens; said positive lens being biconvex and being made of a synthetic resin, said negative lens being meniscus and concave toward the pentagonal prism and being made of an optical glass, said lenses having the following characteristics:

| | r | d | Nd | ν |
|---|---|---|---|---|
| 1 | ∞ | 3.4 | 1.5230 | 58.6 |
| 2 | −78.32 | 0.2 | | |
| 3 | ∞ | 75.22 | 1.51633 | 64.1 |
| 4 | ∞ | 5.30 | | |
| 5 | 60.00 | 4.40 | 1.49300 | 54.2 |
| 6 | −34.287 | 1.00 | | |
| 7 | −26.529 | 1.20 | 1.75520 | 27.5 |
| 8 | −35.184 | | | | where $r_1$ and $r_2$ are the condenser lens, and $r_3$ and $r_4$ are the pentaprism, the distance from the focal plane of the focusing screen to $r_1$ is 0.3, $K_1 = ((1/r_5) + (1/r_8)) f = 0.752$;

$$K_2 = \frac{\left|\frac{1}{r_7} - \frac{1}{r_8}\right|}{\left|\frac{1}{r_5} - \frac{1}{r_6}\right|} = 0.202.$$

Visible Power = 1.1 diopters, the focal length of the eye-piece lens $f = 63.93$, and the $r_5$ surface is an aspherical surface with the aspherical coefficient $B_5 = -5 \times 10^{-6}$
in the equation $$x_5 = r_5 [1 - (1 - \frac{y_5^2}{r_5^2})^{\frac{1}{2}}] + B_5 y_5^4 + C_5 y_5^6$$

where
$x_5$ and $y_5$ are the co-ordinates of a locus of points on a rotating symmetrical surface with the x axis along the light propagation direction and the y axis perpendicular to the x axis, and $r_5$ is the radius of curvature at the vertex of the aspherical surface, and $C_5 = 0$.

5. A camera viewfinder comprising:
a roof type pentagonal prism for reflecting light from a scene; said prism having an entrance face and an exit face, a condenser lens arranged to face the entrance face of said pentagonal prism, and an eyepiece having a positive lens arranged to face the exit face of said pentagonal prism and, after an air space, a negative lens; said positive lens being biconvex and being made of a synthetic resin, said negative lens being meniscus and concave toward the pentagonal prism and being made of an optical glass, said lenses having the following characteristics:

|   | r | d | Nd | ν |
|---|---|---|----|---|
| 1 | ∞ | 3.4 | 1.5230 | 58.6 |
| 2 | −78.32 | 0.2 | | |
| 3 | ∞ | 75.22 | 1.51633 | 64.1 |
| 4 | ∞ | 5.30 | | |
| 5 | 60.00 | 4.40 | 1.49300 | 54.2 |
| 6 | −34.287 | 1.00 | | |
| 7 | −26.529 | 1.20 | 1.75520 | 27.5 |
| 8 | −35.184 | | | | where $r_1$ and $r_2$ are the condenser lens, and $r_3$ and $r_4$ are the pentaprism, the distance from the focal plane of the focusing screen to $r_1$ is 0.3, $$K_1 = (\frac{1}{r_5} + \frac{1}{r_8}) f = 0.752; \quad K_2 = \frac{\left|\frac{1}{r_7} - \frac{1}{r_8}\right|}{\left|\frac{1}{r_5} - \frac{1}{r_6}\right|} = 0.202.$$

Visible power = 1.1 diopters, the focal length of the eye-piece lens $f = 63.93$, and the $r_5$ surface is an aspherical surface with the aspherical coefficients $B_5 = -5 \times 10^{-6}$; $C_5 = 5 \times 10^{-8}$
in the equation $$x_5 = r_5 [1 - (1 - \frac{y_5^2}{r_5^2})^{\frac{1}{2}}] + B_5 y_5^4 + C_5 y_5^6$$

where
$x_5$ and $y_5$ are the co-ordinates of a locus of points on a rotating symmetrical surface with the x axis along the light propagation direction and the y axis perpendicular to the x axis, and $r_5$ is the radius of curvature at the vertex of the aspherical surface.

6. A camera viewfinder comprising:
a roof type pentagonal prism for reflecting light from a scene; said prism having an entrance face and an exit face, a condenser lens arranged to face the entrance face of said pentagonal prism, and an eyepiece having a positive lens arranged to face the exit face of said pentagonal prism and, after an air space, a negative lens; said positive lens being biconvex and being made of a synthetic resin, said negative lens being meniscus and concave toward the pentagonal prism and being made of an optical glass, said lenses having the following characteristics:

|   | r | d | Nd | ν |
|---|---|---|----|---|
| 1 | ∞ | 3.4 | 1.52300 | 58.60 |
| 2 | −78.32 | 0.2 | | |
| 3 | ∞ | 75.22 | 1.51633 | 64.10 |
| 4 | ∞ | 5.30 | | |
| 5 | 41.026 | 4.40 | 1.49300 | 54.20 |
| 6 | −33.635 | 1.00 | | |
| 7 | −27.925 | 1.20 | 1.75520 | 27.50 |
| 8 | −46.475 | | | | where the distance from the focal plane of the focusing screen to the surface $r_1$ is 0.3; $K_1 = (1/r_5) + (1/r_8) f = 0.178$;

$$K_2 = \frac{\left|\frac{1}{r_7} - \frac{1}{r_8}\right|}{\left|\frac{1}{r_5} - \frac{1}{r_6}\right|} = 0.264;$$

the visibility = −1.0 diopters; the focal length of the eye-piece lens $f = 62.43$, and the $r_5$ surface is an aspherical surface with the aspherical coefficient $B_5 = -5 \times 10^{-6}$
in the equation $$x_5 = r_5 [1 - (1 - \frac{y_5^2}{r_5^2})^{\frac{1}{2}}] + B_5 y_5^4 + C_5 y_5^6$$

where
$x_5$ and $y_5$ are the co-ordinates of a locus of points on a rotating symmetrical surface with the x axis along the light propagation direction and the y axis perpendicular to the x axis, and $r_5$ is the radius of curvature at the vertex of the aspherical surface, and $C_5 = 0$.

7. A camera viewfinder comprising:
a roof type pentagonal prism for reflecting light from a scene; said prism having an entrance face and an exit face, a condenser lens arranged to face the entrance face of said pentagonal prism, and an eyepiece having a positive lens arranged to face the exit face of said pentagonal prism and, after an air space, a negative lens; said positive lens being biconvex and being made of a synthetic resin, said negative lens being meniscus and concave toward the pentagonal prism and being made of an optical glass, said lenses having the following characteristics: being made of a synthetic resin, said negative lens being meniscus and concave toward the pentagonal prism and being made of an optical glass, said lenses having the following characteristics:

| r | d | Nd | ν |
|---|---|---|---|
| 1 | ∞ | 3.4 | 1.52300 | 58.60 |
| 2 | −78.32 | 0.2 | | |
| 3 | ∞ | 75.22 | 1.51633 | 64.10 |
| 4 | ∞ | 5.30 | | |
| 5 | 41.026 | 4.40 | 1.49300 | 54.20 |
| 6 | −33.635 | 1.00 | | |
| 7 | −27.925 | 1.20 | 1.75520 | 27.50 |
| 8 | −46.475 | | | | where the distance from the focal plane of the focusing screen to the surface $r_1$ is 0.3; $K_1 = ((1/r_5) + (1/r_8)) f = 0.178$;

$$K_2 = \frac{\left|\frac{1}{r_7} - \frac{1}{r_8}\right|}{\left|\frac{1}{r_5} - \frac{1}{r_6}\right|} = 0.264;$$

the visibility = −1.0 diopters; the focal length of the eye-piece lens f=62.43, and the $r_5$ surface is an aspherical surface with the aspherical coefficients $B_5 = -5 \times 10^{-6}$; $C_5 = 5 \times 10^{-8}$ in the equation $$x_5 = r_5 \left[1 - (1 - \frac{y_5^2}{r_5^2})^{\frac{1}{2}}\right] + B_5 y_5^4 + C_5 y_5^6$$

where
$x_5$ and $y_5$ are the co-ordinates of a locus of points on a rotating symmetrical surface with the x axis along the light propagation direction and the y axis perpendicular to the x axis, and $r_5$ is the radius of curvature at the vertex of the aspherical surface.

8. A camera viewfinder comprising:
a roof type pentagonal prism for reflecting light from a scene; said prism having an entrance face and an exit face, a condenser lens arranged to face the entrance face of said pentagonal prism, and an eyepiece having a positive lens arranged to face the exit face of said pentagonal prism and, after an air space, a negative lens; said positive lens being biconvex and being made of a synthetic resin, said negative lens being meniscus and concave toward the pentagonal prism and being made of an optical glass, said lenses having the following characteristics:

| r | d | Nd | ν |
|---|---|---|---|
| 1 | ∞ | 3.4 | 1.5230 | 58.6 |
| 2 | −78.32 | 0.2 | | |
| 3 | ∞ | 75.22 | 1.51633 | 64.1 |
| 4 | ∞ | 5.3 | | |
| 5 | 33.003 | 4.4 | 1.49300 | 54.2 |
| 6 | −36.657 | 1.0 | | |
| 7 | −36.464 | 1.2 | 1.75520 | 27.5 |
| 8 | −89.442 | | | | where the distance from the focal plane of the focusing screen to the $r_1$ surface is 0.3;

$$K_1 = (\frac{1}{r_5} + \frac{1}{r_8}) f = 1.169; K_2 = \frac{\left|\frac{1}{r_7} - \frac{1}{r_8}\right|}{\left|\frac{1}{r_5} - \frac{1}{r_6}\right|} = 0.282;$$

visibility = −1.0 diopters; focal length of the eye-piece lens f=61.13; and the $r_5$ surface is an aspherical surface with the aspherical coefficient $B_5 = -5 \times 10^{-6}$
in the equation $$x_5 = r_5 \left[1 - (1 - \frac{y_5^2}{r_5^2})^{\frac{1}{2}}\right] + B_5 y_5^4 + C_5 y_5^6$$

where
$x_5$ and $y_5$ are the co-ordinates of a locus of points on a rotating symmetrical surface with the x axis along the light propagation direction and the y axis perpendicular to the x axis, and $r_5$ is the radius of curvature at the vertex of the aspherical surface, and $C_5 = 0$.

9. A camera viewfinder comprising:
a roof type pentagonal prism for reflecting light from a scene; said prism having an entrance face and an exist face, a condenser lens arranged to face the entrance face of said pentagonal prism, and an eyepiece having a positive lens arranged to face the exit face of said pentagonal prism and, after an air space, a negative lens; said positive lens being biconvex and being made of a synthetic resin, said negative lens being meniscus and concave toward the pentagonal prism and being made of an optical glass, said lenses having the following characteristics:

| r | d | Nd | ν |
|---|---|---|---|
| 1 | ∞ | 3.4 | 1.5230 | 58.6 |
| 2 | −78.32 | 0.2 | | |
| 3 | ∞ | 75.22 | 1.51633 | 64.1 |
| 4 | ∞ | 5.3 | | |
| 5 | 33.003 | 4.4 | 1.49300 | 54.2 |
| 6 | −36.657 | 1.0 | | |
| 7 | −36.464 | 1.2 | 1.75520 | 27.5 |
| 8 | −89.442 | | | | where the distance from the focal plane of the focusing screen to the $r_1$ surface is 0.3;

$$K_1 = (\frac{1}{r_5} + \frac{1}{r_8}) f = 1.169; K_2 = \frac{\left|\frac{1}{r_7} - \frac{1}{r_8}\right|}{\left|\frac{1}{r_5} - \frac{1}{r_6}\right|} = 0.282;$$

visibility = −1.0 diopters; focal length of the eye-piece lens f=61.13, and the $r_5$ surface is an aspherical surface with the aspherical coefficients $B_5 = -5 \times 10^{-6}$; $C_5 = 5.86 \times 10^{-8}$
in the equation $$x_5 = r_5 [1 - (1 - \frac{y_5^2}{r_5^2})^{\frac{1}{2}}] + B_5 y_5^4 + C_5 y_5^6$$

where
$x_5$ and $y_5$ are the co-ordinates of a locus of points on a rotating symmetrical surface with the x axis along the light propagation direction and the y axis perpendicular to the x axis, and $r_5$ is the radius of curvature at the vertex of the aspherical surface.

* * * * *